Jan. 24, 1950     J. B. LEONARD     2,495,532
PIPE FITTING
Filed April 4, 1947
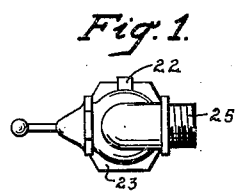
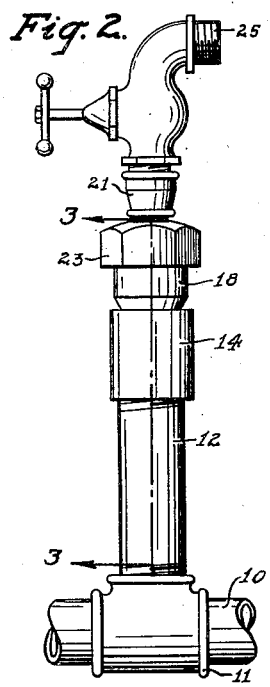
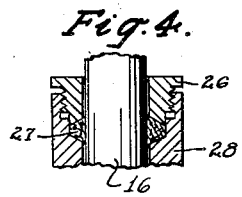
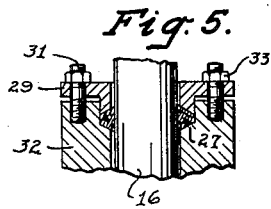
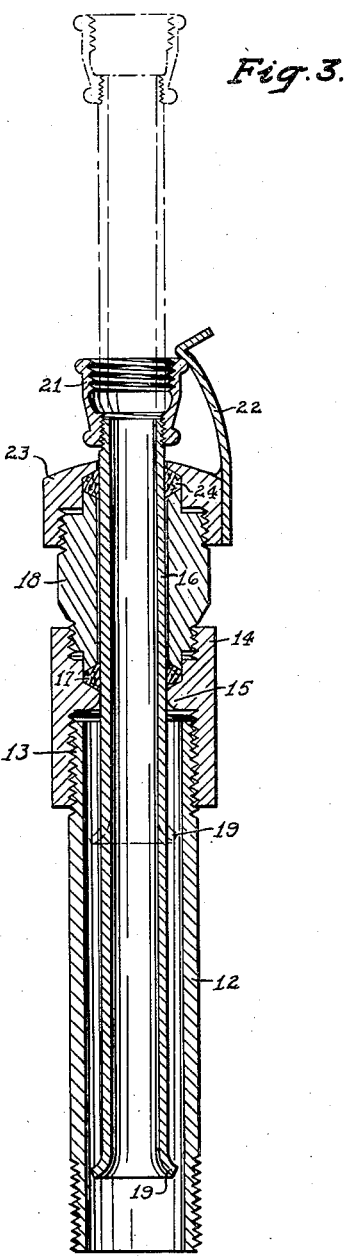
INVENTOR.
JAMES B. LEONARD
BY *Victor J. Evans & Co.*
ATTORNEYS Patented Jan. 24, 1950

2,495,532

UNITED STATES PATENT OFFICE 2,495,532

PIPE FITTING

James B. Leonard, Del Rio, Tex.

Application April 4, 1947, Serial No. 739,351

1 Claim. (Cl. 285—2)

This invention relates to pipe fittings and more particularly to a fitting adapted to be axially slidable in and out of a pipe to locate the spigot at different extended positions and wherein the slidable fitting can be revolved to position the spigot to different angles for extending the flow of water or other liquid (or gas).

It is an object of the present invention to provide an adjustable pipe fitting which will be slidable in and out of a larger pipe and also rotatable there within and which is of simple construction, inexpensive to manufacture, water-tight, and efficient in operation.

For other objects of the invention and for a better understanding of the invention, reference may be had to the following detailed description taken in connection with the accompanying drawing, in which Fig. 1 is a front elevational view looking upon the spigot end of the fitting, Fig. 2 is a side-elevational view of the extended pipe, the fitting, and the spigot, Fig. 3 is an enlarged cross-sectional view taken on line 3—3 of Fig. 2, and looking in the direction of the arrows thereof.

Fig. 4 is a fragmentary cross-sectional view taken through a modified form of packing gland, Fig. 5 is a fragmentary cross-sectional view of still another form of top packing gland.

Referring now to the figures, 10 represents a water pipe having a T-fitting 11 from which is extended a pipe 12 which is threaded as indicated at 13 to receive a sleeve fitting 14 having a radially inwardly extending portion 15 to serve as a guide for an axially adjustable pipe 16 and as a support for packing material 17 which is retained in place by a sleeve fitting 18 threadedly connected to the top of the fitting 14. The pipe 16 is also adjustable through the sleeve 18 and has an outwardly flared end 19 which will abut the radially inwardly extending portion 15 of the sleeve 14 to limit the outward movement of the pipe 16.

The top of the pipe 16 is threaded and receives a pipe coupling 21 to which a spigot 22 is connected. The pipe 16 will be retained in its retracted position by a spring portion 22 engaging with the top of the coupling 21 and fixed to a sleeve nut 23 threaded upon the top of the sleeve 18 to retain a packing 24. It will be apparent that by the use of a double packing arrangement there is little opportunity for leakage. The pipe 16 can also be rotated within the arrangement so as to direct nozzle 25 of spigot 22 in any direction to render the same more suitable for the attachment thereto of a hose coupling.

Referring now particularly to Fig. 4, an internal nut 26 is used for securing packing 27 within an internally threaded sleeve 28. The pipe 16 is slidable through this packing gland. In Fig. 5 gland 27 is retained in place by a plate 29 fitted over studs 31 in a sleeve 32 and secured thereto by nuts 33.

Having now described my invention, I claim:

In extensible piping, the combination of an outer pipe having one end provided with a portion adapted to form a part of a sealed joint, a sleeve fitting having a bore provided with end portions adapted to form parts of sealed joints, one of said end portions of said sleeve fitting being joined and sealed to said outer pipe end portion, an annular shoulder intermediate the ends of the bore extending radially inwardly thereof, a sleeve joined and sealed to the remaining end portion of said sleeve fitting, a sleeve nut threaded on said sleeve, an inner pipe telescoping within said outer pipe and slidably guided by said annular shoulder, an outwardly flared portion terminating the inner end of said inner pipe, said flared portion being adapted to abut said annular shoulder to limit movement of said inner pipe outward of said outer pipe, a pipe coupling attached to the outer end of said inner pipe, said pipe coupling being adapted to abut said sleeve nut to limit movement of said inner pipe inwardly of said outer pipe, spring latch means attached to said sleeve nut and adapted to engage said pipe coupling when adjacent said sleeve nut to retain said inner pipe in retracted position, a packing means retained between said sleeve nut and sleeve and in fluid-tight slidable guiding relationship about said inner pipe and a packing means retained between said sleeve and annular shoulder and in fluid-tight slidable guiding relationship about said inner pipe.

JAMES B. LEONARD.

REFERENCES CITED

The following references are of record in the file of this patent:

UNITED STATES PATENTS

| Number | Name | Date |
|---|---|---|
| 1,929,190 | Parker | Oct. 3, 1933 |
| 1,972,084 | Bogart | Sept. 4, 1934 |
| 2,298,119 | Gebert | Oct. 6, 1942 |